(12) United States Patent
Nakanishi

(10) Patent No.: US 6,653,989 B2
(45) Date of Patent: Nov. 25, 2003

(54) COMPOSITE DISPLAY APPARATUS AND HEAD MOUNTED DISPLAY SYSTEM USING THE SAME

(75) Inventor: Hiroyuki Nakanishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 09/818,601

(22) Filed: Mar. 28, 2001

(65) Prior Publication Data

US 2002/0113754 A1 Aug. 22, 2002

(30) Foreign Application Priority Data

Feb. 21, 2001 (JP) ........................................ 2001-045537

(51) Int. Cl.7 ................................................. G09G 5/00
(52) U.S. Cl. ................... 345/7; 345/8; 345/9; 345/102; 348/115; 349/11; 349/13; 359/13; 359/15; 359/630; 359/631; 359/633
(58) Field of Search ............................ 345/7–9, 87, 88, 345/102, 207; 349/2, 11, 13; 359/13–15, 627, 628–633; 348/115

(56) References Cited

U.S. PATENT DOCUMENTS 5,844,530 A * 12/1998 Tosaki ........................... 345/8
5,933,279 A * 8/1999 Yamazaki ..................... 359/630
6,084,557 A * 7/2000 Ishida et al. ..................... 345/9
6,239,915 B1 * 5/2001 Takagi et al. ................ 359/629

FOREIGN PATENT DOCUMENTS

| JP | 04-022358 | 1/1992 |
| JP | 05-303053 | 11/1993 |
| JP | 11-174367 | 7/1999 |

* cited by examiner

Primary Examiner—Richard Hjerpe
Assistant Examiner—Henry N. Tran
(74) Attorney, Agent, or Firm—Fitzpatrick, Cella, Harper & Scinto (57) ABSTRACT

A composite display apparatus keeps both optical density of display images formed by a display means and shutter speed of cameras such as a CCD in an optimum state relative to the external world light (see-through light), even in environments where the quantity of see-through light varies widely. The composite display apparatus includes a display optical system for guiding a light beam from a display means to the eyeballs of an observer; an image-pickup optical system for allowing an external light beam to form an image on an image-pickup means; and an optical path separating means provided in an optical path for allowing an ocular optical axis of the light beam of the display optical system entering the eyeballs of the observer, or an imaginary ocular optical axis which is an extension of the ocular optical axis, and an external world optical axis of the light beam entering the image-pickup optical system to substantially coincide.

13 Claims, 11 Drawing Sheets

COMPOSITE DISPLAY APPARATUS AND HEAD MOUNTED DISPLAY SYSTEM USING THE SAME

FIELD OF THE INVENTION

The present invention relates to a composite display apparatus including an image-pickup optical system for guiding light from the image information of its external world to an image-pickup device and a display optical system for guiding light exiting from a liquid crystal display etc. to the eyeballs of an observer.

BACKGROUND OF THE INVENTION

There have been proposed units including a head mounted display (HMD) and a miniature CCD camera attached thereto and displaying image information obtained from the camera on a display device included in the HMD directly or after subjecting the image information to some image processing. There have also been proposed various see-through type HMDs which use optical coupling/separating devices, such as a half mirror, and enable not only the observation of images displayed on a display device, but also the direct observation of its external world at an angular magnification of ×1.

In the above forms of HMDs, a difference between the ocular optical axis of the display optical system, which is for allowing the person equipped with the HMD to observe the image information displayed on the display device of the HMD, and the optical axis of the CCD camera (image-pickup optical system), which is for allowing the image information of its external world to form an image on the CCD surface, results in parallax.

So there have been proposed units including both image-pickup optical system and display optical system which is free from parallax in Japanese Patent Application Laid-Open No. 4-22358 and Japanese Patent Application Laid-Open No. 5-303053.

The display optical system of the visual aid unit proposed in Japanese Patent Application Laid-Open No. 4-22358 is constructed in such a manner that light emitted from a miniature liquid crystal display unit passes through a plane half mirror and then is guided to eyeballs by an ocular. On the other hand, the image-pickup optical system of the same is constructed in such a manner that light of its external world passes through the plane half mirror and then forms an image in a miniature camera which is provided in such a position as to face the liquid crystal device across the half mirror. This visual aid unit, however, tends to be large because the plane half mirror used in the unit is arranged at an angle of 45 degrees. In addition, this unit cannot apply to see-thorough type units because there is arranged an ocular in front of the eyeballs of an observer.

On the other hand, in Japanese Patent Application Laid-Open No. 5-303053, there is disclosed a head mounted display system which includes an image pickup optical system and a display optical system and is capable of constituting a see-through type unit; however, the unit has a complicated optical system and tends to be very large.

The applicants of the present invention have already overcome these problems and proposed composite display apparatus in Japanese Patent Application Laid-Open No. 11-174367 which includes a display optical system with more than one eccentric reflection surface for guiding a light beam from a display means, such as a liquid crystal display (LCD), to the eyeballs of an observer and an image-pickup optical system for allowing image information of its external world to form an image on the surface of an image-pickup device, such as CCD, and enable preventing the light beam from the display means from entering the pickup surface of the image-pickup optical system, in addition, observing the image information of both optical systems and creating an image of the same in a good state where there results no parallax while allowing the entire unit to be miniaturized.

Figure 10:
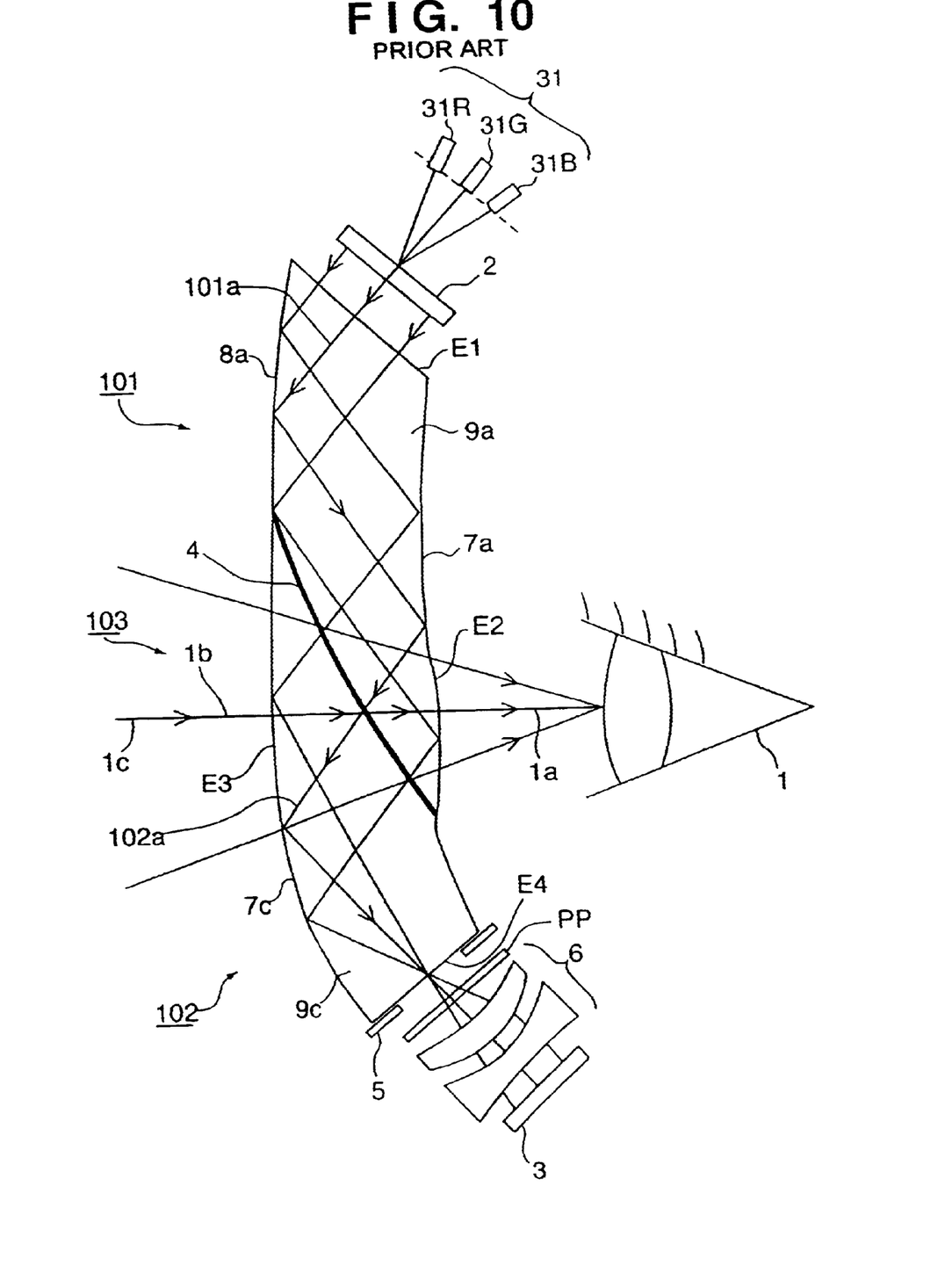
FIG. 10 is a view showing one example of optical system configurations of the composite display apparatus of the prior art.

FIG. 10 is a schematic view showing the main part of one form of the composite display apparatus proposed in Japanese Patent Application Laid-Open No. 11-174367. In the same figure, reference numeral 101 denotes a display optical system (LCD display optical system) which consists of a prism body 9a utilizing more than one internal reflection, includes more than one eccentric reflection surface each having more than one eccentric curvature, and realizes a color display using a ferroelectric display device 2 (FLCD), as a display means, by illuminating the display device with three light sources 31R, 31G and 31B radiating respective color light in a time-sharing manner one by one while synchronizing the illumination with the display of the color image separated into colors R, G and B. R, G and B images are displayed within 1/60 to 1/30 seconds altogether utilizing the afterimage effect. Each of the light sources 31R, 31G and 31B can be constructed by combining a white-light source and a color filter. The image information displayed on the FLCD 2 is guided to the eyeballs of an observer through a display optical system 101. The display optical system 101a is an optical axis.

Reference numeral 102 denotes an image-pickup optical system (CCD image-pickup optical system) which, like the display optical system 101, consists of a prism body 9c utilizing more than one internal reflection, includes more than one eccentric reflection surface each having more than one eccentric curvature, and images the image information of its external world on an image-pickup device (CCD) 3. Reference numeral 102a is an optical axis of the image-pickup optical system. The display optical system 101 and the image-pickup optical system 102 are joined together via an optical path separating means 4.

The optical path separating means 4 consists of eccentrically curved reflection surfaces, which separate the optical paths from the display optical system 101 and from the image-pickup optical system 102. The optical path separating means 4 consists of eccentric reflection surfaces, the surface on one side being used in the display optical system 101 and the surface on the other side being used in the image-pickup optical system 102.

The light beam from the image information displayed on the FLCD 2 exits in the form of linearly polarized light. PP denotes a sheet polarizer and its polarization axis are established in such a direction as to be at right angle to the polarization axis of the linearly polarized light radiated from the FLCD 2. Thus, the linearly polarized light from the FLCD 2 is prevented from entering a CCD 3 through an optical system 6 via the optical path separating means 4 and prism body 9c, as described later. Reference numeral 5 denotes a diaphragm. Numeral 6 denotes an optical system which images the image of its external world entering via the prism body 9c on a CCD 3 surface.

Further, this composite display apparatus allows its external world to be visible through the prism bodies 9a, 9c; accordingly, it can constitute a see-through type unit. In other words, the users of this composite display apparatus observe an image which is the superposition of image information of its external world and that displayed on the FLCD 2. When establishing a see-through optical system 103, in addition to the display optical system 101 and the image-pickup optical system 102, for observing image information of its external world alone, the reflection surface of the optical path separating means 4 is a half mirror (the transmittance-to-reflectance ratio is not limited to 50%:50%, but is arbitrary) and the refractive index of the materials of the prism bodies 9a, 9c of both optical systems 101, 102 are the same. Reference numeral 1c denotes an optical axis of the see-through optical system 103 (external world optical axis).

In FIG. 10, the optical axis 101a of the display optical system 101, the optical axis 102a of the image-pickup optical system 102 and the optical axis 1c of the see-through optical system 103 coincide at the optical path separating means 4 and become co-axial with an ocular optical axis 1a. Establishing each constituent as above enables a miniaturized optical system. Further, establishing the refracting power of each eccentric reflection surface differently depending on the azimuth angle around its vertex enables maintaining a satisfactory optical performance.

In such a composite display apparatus, the light from the FLCD 2 enters an incidence surface E1 of the prism body 9a which constitutes the display optical system 101, reflects on a reflection surface 8a, enters a total reflection surface 7a at an incidence angle more than critical angle and totally reflects thereon, reflects on the optical path separating means 4, enters the total reflection surface 7a at an incidence angle less than critical angle and penetrates a penetration surface E2, and is guided to the eyeballs 1 of an observer. The display optical system reflects the light beam from the FLCD 2 twice or three times without creating an image and guides the same to the eyeballs 1 of an observer, as described above. Thus the image information displayed on the FLCD 2 is presented to the observer.

On the other hand, the light from the external world of the unit enters an incidence surface E3 (part of a total reflection surface 7c) of the prism body 9c which constitutes the image-pickup optical system 102, reflects on the optical path separating means 4, enters the total reflection surface 7c at an incidence angle more than critical angle and totally reflects thereon, exits from an exit surface E4 of the prism body 9c, and then passes through the diaphragm 5 and the optical system 6, so as to create an image on the CCD 3. Thus the image information of the external world can be obtained.

In the see-through optical system 103 shown in FIG. 10, the light from the external world enters the incidence surface E3 of the prism body 9c of the image-pickup optical system, penetrates the optical path separating means 4 (half mirror), enters the exit surface E2 at an incidence angle less than critical angle, and penetrates the exit surface E2, so as to be guided to the eyeballs 1 of an observer. Thus, the observer can observe the image information of the external world.

In FIG. 10, the sheet polarizer PP is arranged in the neighborhood of the diaphragm 5 of the image-pickup optical system 102, that is, in the neighborhood of the position of the observer's pupils. The polarization axis of this sheet polarizer PP is established in such a manner as to be at right angles to that of the linearly polarized light from the FLCD 2.

Thus, the light from the FLCD 2 is prevented from entering the CCD 3 surface through the optical system 6 via the optical path separating means 4 and prism body 9c and from causing flare, thereby the optical properties of the image information of the external world obtained on the CCD 3 can be maintained satisfactorily.

The total reflection surface 7a and the exit surface E2 of the prism body 9a consist of the same curved surface, and they are changed properly depending on the incidence conditions of the light beam. The incidence surface E3 and the total reflection surface 7c of the prism body 9c also consist of the same curved surface, and they are changed properly depending on the incidence conditions of the light beam, like the case of the prism body 9a.

In the construction of this display unit, the ocular optical axis 1a of the light beam entering the eyeballs 1 or an imaginary ocular optical axis 1b which is an extension of the ocular optical axis 1a, the external world optical axis 1c of the light beam entering the image-pickup optical system 102 from the external world (the optical axis 102a of the image-pickup optical system 102) are allowed to almost coincide by arranging the display optical system 101 and the image-pickup optical system 102 facing each other across the optical path separating means 4, thereby the observation of the image information displayed on the FLCD 2, imaging of the image information of the external world on the CCD 3 surface and observation of the image information of the external world (see-through optical system) are enabled simultaneously in state where there results no parallax.

Figure 11:
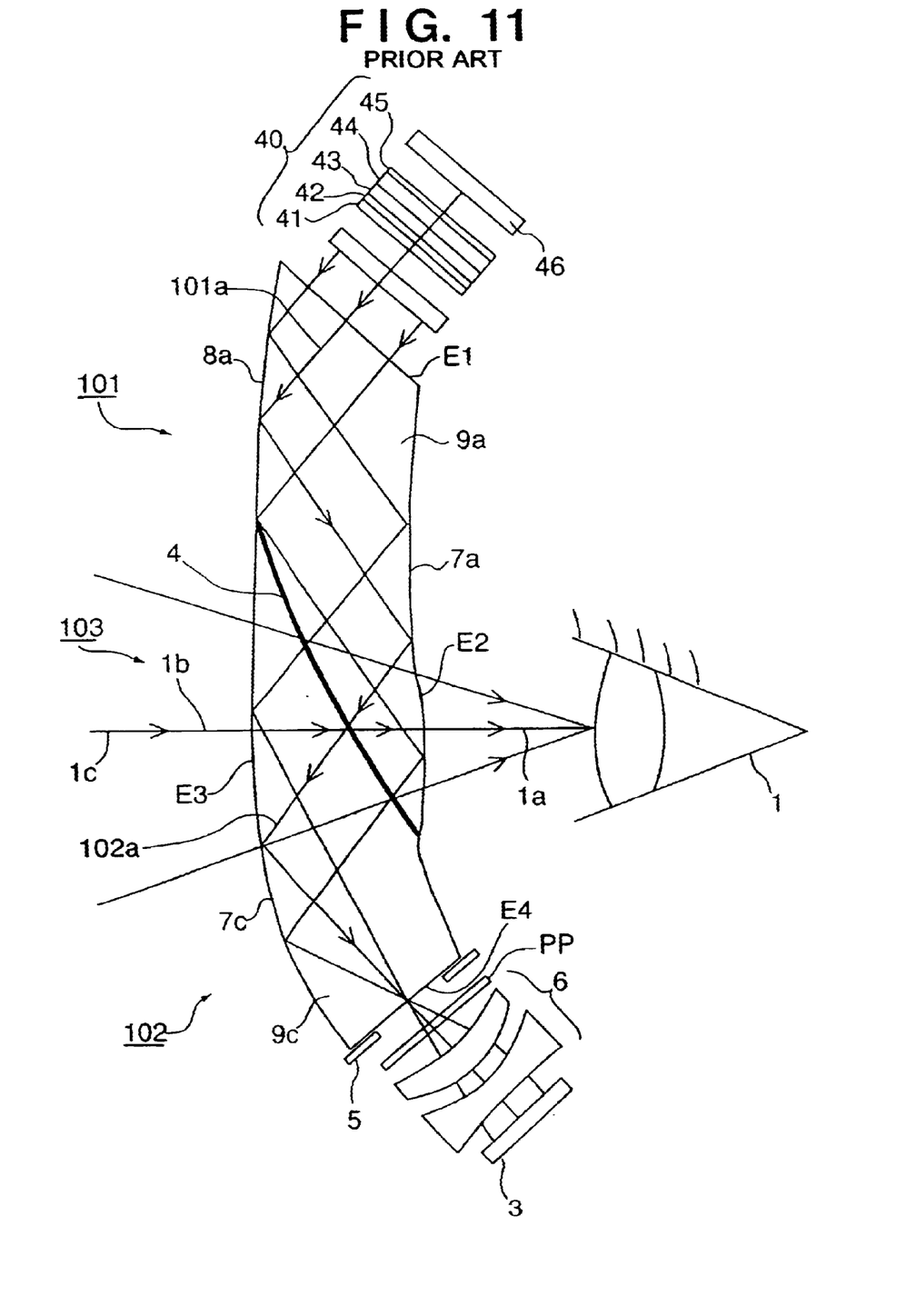
FIG. 11 is a view showing another example of optical system configurations of the composite display apparatus of the prior art.

FIG. 11 shows the same composite display apparatus as shown in FIG. 10, except that it includes a color LCD 40 with a backlight 46 as a display means.

In FIG. 11, the color liquid crystal display LCD 40 includes a sheet polarizer 41, a cover glass 42, a color filter 43 consisting of R, G and B micro filters arranged two-dimensionally at a predetermined pitch, a liquid crystal display device 44, and a sheet polarizer 45.

The color image information (pixels) displayed on the liquid crystal display device 44 is illuminated with the light beam (white light) from the backlight 46 via the sheet polarizer 45 and the light beam from each pixel is allowed to exit via the color filter 43 and the sheet polarizer 41.

In the construction as above, the same effects as the construction shown in FIG. 10 can be produced by establishing the polarization axis of the polarized light beam exiting from the color liquid crystal display LCD 40 in such a manner as to be at right angles to the polarization axis of the sheet polarizer PP. The other constituents and construction are the same as that of FIG. 10, therefore the description thereof shall be omitted here.

Figure 8:
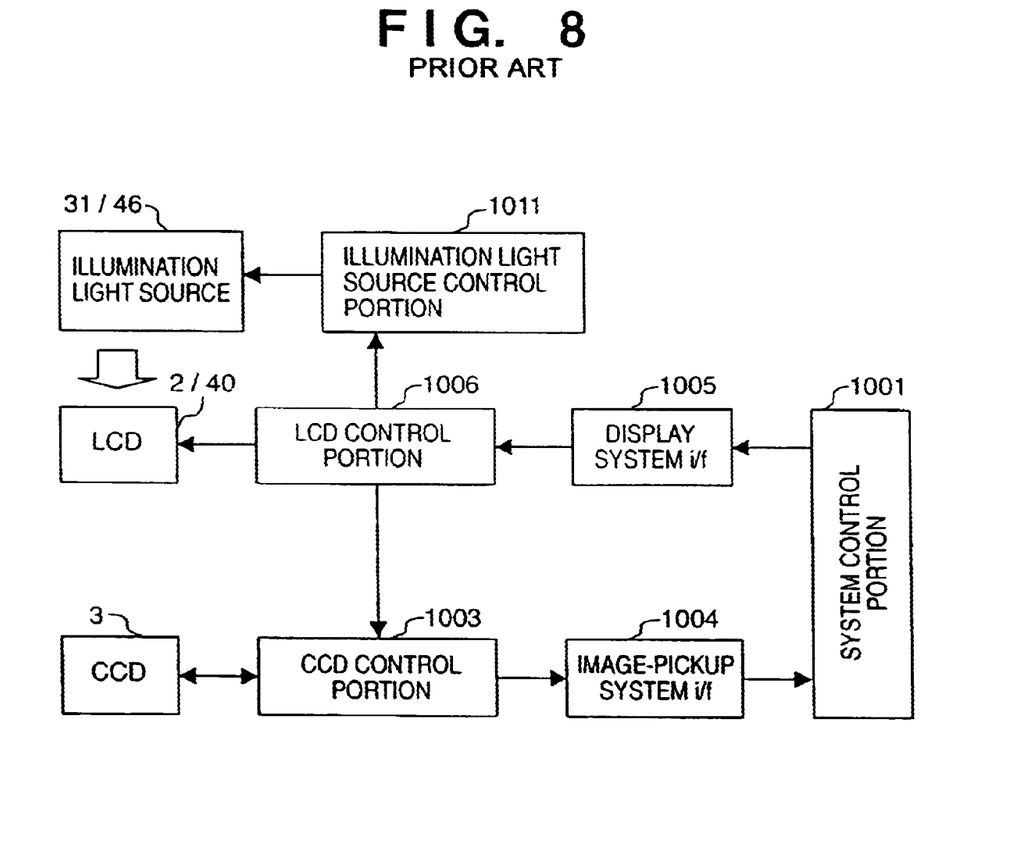
FIG. 8 is a block diagram showing a control circuit configuration of a composite display apparatus of the prior art.
Figure 9A:
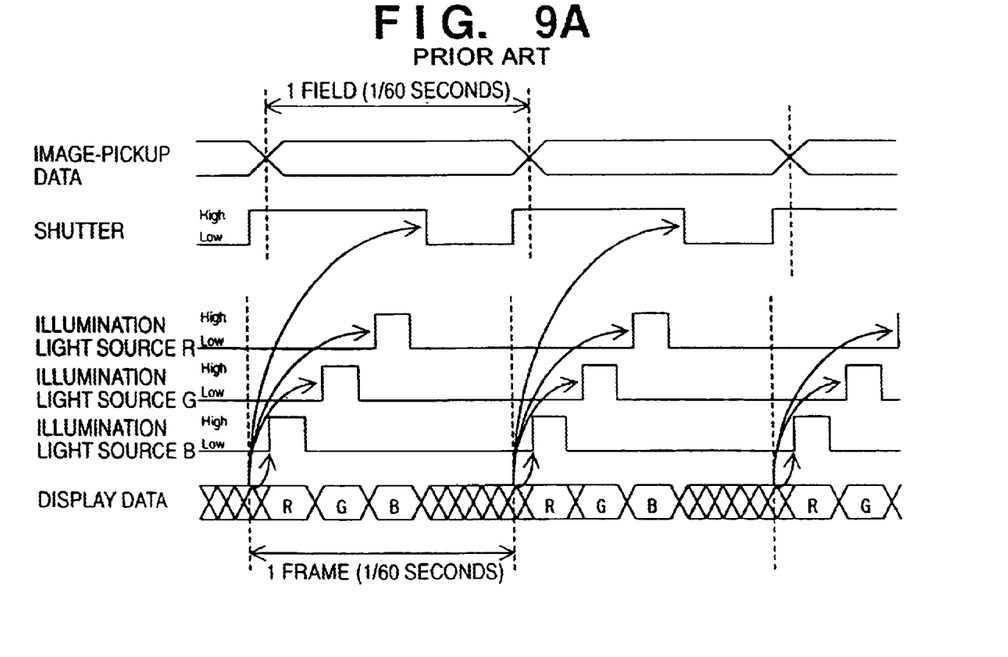
FIGS. 9A and 9B are timing charts illustrating the display control and illumination control in the composite display apparatus of the prior art.
Figure 9B:
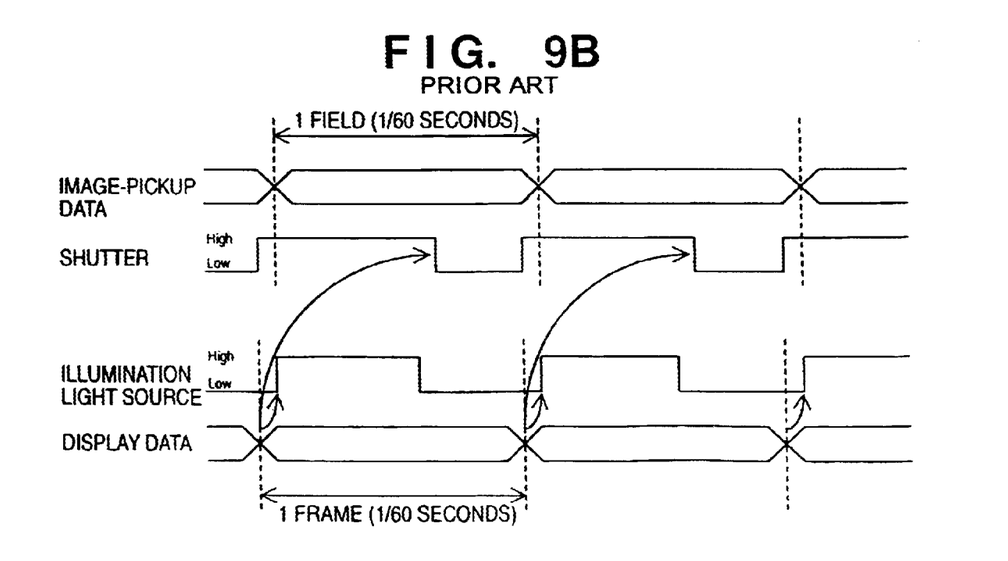

FIG. 8 shows one example of the circuit configurations of the currently used composite display apparatus, FIG. 9A one example of the timing charts of the composite display apparatus having the construction shown in FIG. 10, and FIG. 9B one example of the timing charts of the composite display apparatus having the construction shown in FIG. 11.

In FIG. 8, reference numeral 1001 denotes a system control portion for controlling the entire composite display apparatus, which consists of a computer system including CPU, ROM, RAM, etc. Numeral 1003 denotes a CCD control portion for performing timing control over the CCD 3, adjustments of image-pickup data, etc., numeral 1004 an image-pickup system interface portion for converting image-pickup data to a data format which can be input to the system controlling portion 1001, numeral 1005 a display system interface portion for converting display data output from the system control portion 1001 to a data format which can be displayed by the FLCD 2 (or the color LCD 40), numeral 1006 an LCD control portion for performing timing control over the FLCD 2 (or the color LCD 40), adjustments of the display data, etc., and numeral 1011 an illumination light source control portion for controlling operation timing of illumination light sources (31R, 31G, 31B or 46).

In FIGS. 9A and 9B, "IMAGE-PICKUP DATA" shows the state of image-pickup data output from the CCD 3, and "SHUTTER" the state of an electronic shutter, High indicating the closed state, Low indicating the open state. "DISPLAY DATA" shows the state of the contents displayed on the FLCD 2 (or the color LCD 40); "ILLUMINATION LIGHT SOURCE R", "ILLUMINATION LIGHT SOURCE G" and "ILLUMINATION LIGHT SOURCE B" in FIG. 9A show the states of the red illumination light source (31R), green illumination light source (31G) and blue illumination light source (31B), respectively; and "ILLUMINATION LIGHT SOURCE" in FIG. 9B shows the sate of the white illumination light source 46. In each illumination state, High indicates the operating state and Low indicates non-operating state.

In the following, the examples of the currently used composite display apparatus will be further described.

In the image-pickup system, image-pickup data are output from the CCD 3 based on the timing controlled by the CCD control portion 1003, subjected to data adjustments, such as CDS (Correlated Double Sampling), AGC (Automatic Gain Control) and AWB (Automatic White Balance), at the CCD control portion 1003, converted to standard data of, for example, NTSC and PAL, at the image-pickup system interface portion 1004, and introduced into the system control portion 1001.

On the other hand, in the display system, display data of, for example, VGA and LDI formats output from the system control portion 1001 are converted at the display system interface portion 1005 to a data format which can be displayed by the LCD (2 or 40), subjected to data adjustments such as a gamma correction at the LCD control portion 1006, and output to the LCD (2 or 40) based on the timing generated so as to display an image thereon. In this process, the signal of the display timing is input to the illumination light source control portion 1011 as well, so that the operation timing of the illumination light source (31 or 46) can be controlled according to the display timing.

In order for the operation timing of the illumination light source (31 or 46) in the display system not to coincide with the timing of opening the electronic shutter in the image-pickup system, first the display timing signal of the LCD control portion 1006 is input to the CCD control portion 1003 to establish synchronization of the display system and the image-pickup system. Then, the illumination light source (31 or 46) is allowed to be in the on state for a fixed period of time by the illumination light source control portion 1011, and a trigger signal for opening the electronic shutter for a fixed period time is output from the CCD control portion 1003 to the CCD 3.

At this point, the shutter speed is generally set at $1/100$ seconds in view of the occurrence of flicker when using the display unit indoors. And based on 1 field (60 Hz) of the NTSC, which is a standard signal of a video system, the period of one cycle is $1/60$ seconds, accordingly the operating duration of the illumination light source (31 or 46) at this time is ($1/60$–$1/100$) seconds or less, that is, 6 milliseconds.

In the aforementioned composite display apparatus proposed in Japanese Patent Application Laid-Open No. 11-174367, however, no particular reference is made to the adjustments of the quantity of the image display light and the shutter speed of the CCD camera, but they are treated as fixed to some extent.

Accordingly, when using the composite display apparatus in a light place, if the quantity of light from the display means, such as a liquid crystal display (LCD), is kept constant regardless of the increase in quantity of the see-through light guided from the external world directly to the eyes of an observer, the display tends to be faint relative to the see-through images, and if the shutter speed of the image-pickup device, such as a CCD, is kept constant, flare and smear may be caused on the picked-up image due to the excess light quantity.

Contrarily, when using the composite display apparatus in a dark place, if the quantity of light from the display means, such as a liquid crystal display (LCD), is kept constant regardless of the decrease in quantity of the see-through light guided from the external world directly to the eyes of an observer, the display tends to be strong relative to the see-through images, and if the shutter speed of the image-pickup device, such as a CCD, is kept constant, the picked-up image may be dark or the contrast thereof may be decreased due to the insufficient light quantity.

SUMMARY OF THE INVENTION

The present invention has been made in light of the problems attendant to the prior arts described above; accordingly, one of the objects of the present invention is to provide a composite display apparatus which enables keeping both optical density of display images formed by a display means and shutter speed of a CCD etc. in an optimum state relative to the light from its external world (see-through light), even in the use environments in which it is assumed that the quantity of see-through light varies widely.

Another object of the present invention is to provide a flexible composite display apparatus by allowing a composite display apparatus to be free from the constraint that the field period of the image-pickup system should correspond to the frame period of the display system.

Specifically, the composite display apparatus of the present invention includes a display optical system for guiding a light beam from a display means to the eyeballs of an observer; an image-pickup optical system for allowing a light beam from its external world to form an image on an image-pickup means; and an optical path separating means provided in optical path for allowing an ocular optical axis of the light beam of the display optical system entering the eyeballs of the observer, or an imaginary ocular optical axis which is an extension of the ocular optical axis, and an external world optical axis of the light beam entering the image-pickup optical system from the external world to substantially coincide; the display means displaying image information periodically and intermittently, the image-pickup means recording image information from the external world periodically while the display means is not displaying image information, and the composite display apparatus is characterized by further including a change means capable of changing the display period of displaying image information on the display means and/or the image-pickup period of recording image information from the external world in the image-pickup means.

The above-described objects of the present invention can be accomplished with a head mounted display system using the composite display apparatus of the present invention.

The construction described above enables overcoming the disadvantages of the prior arts in that, when using the composite display apparatus in a light place, if the quantity of light from the display means, such as a liquid crystal display (LCD), is kept constant regardless of the increase in quantity of the see-through light guided from the external world directly to the eyes of an observer, the display tends to be faint relative to the see-through images, and if the shutter speed of cameras such as a CCD is kept constant, flare and smear may be caused on the picked-up image due to the excess light quantity, and contrarily, when using the composite display apparatus in a dark place, if the quantity of light from the display means, such as a liquid crystal display (LCD), is kept constant regardless of the decrease in quantity of the see-through light guided from the external world directly to the eyes of an observer, the display tends to be strong relative to the see-through images, and if the shutter speed of cameras such as a CCD is kept constant, the picked-up image may be dark or the contrast thereof may be decreased due to the insufficient light quantity.

Further, such a construction provides a composite display apparatus which enables keeping both optical density of display images formed by a display means and shutter speed of cameras such as a CCD in an optimum state relative to the see-through light, even in the use environments in which it is assumed that the quantity of see-through light varies widely. In addition, such a construction also provides a flexible composite display apparatus by allowing a composite display apparatus to be free from the constraint that the field period of the image-pickup system should correspond to the frame period of the display system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

In the following, the present invention will be described in detail in terms of its preferred embodiments with reference to FIGS. 1 to 7A and 7B. And in the following description, the same constituents as those of FIGS. 8 to 11 described above shall be denoted with the same reference numerals and the repetition of the same description shall be omitted.

Figure 1:
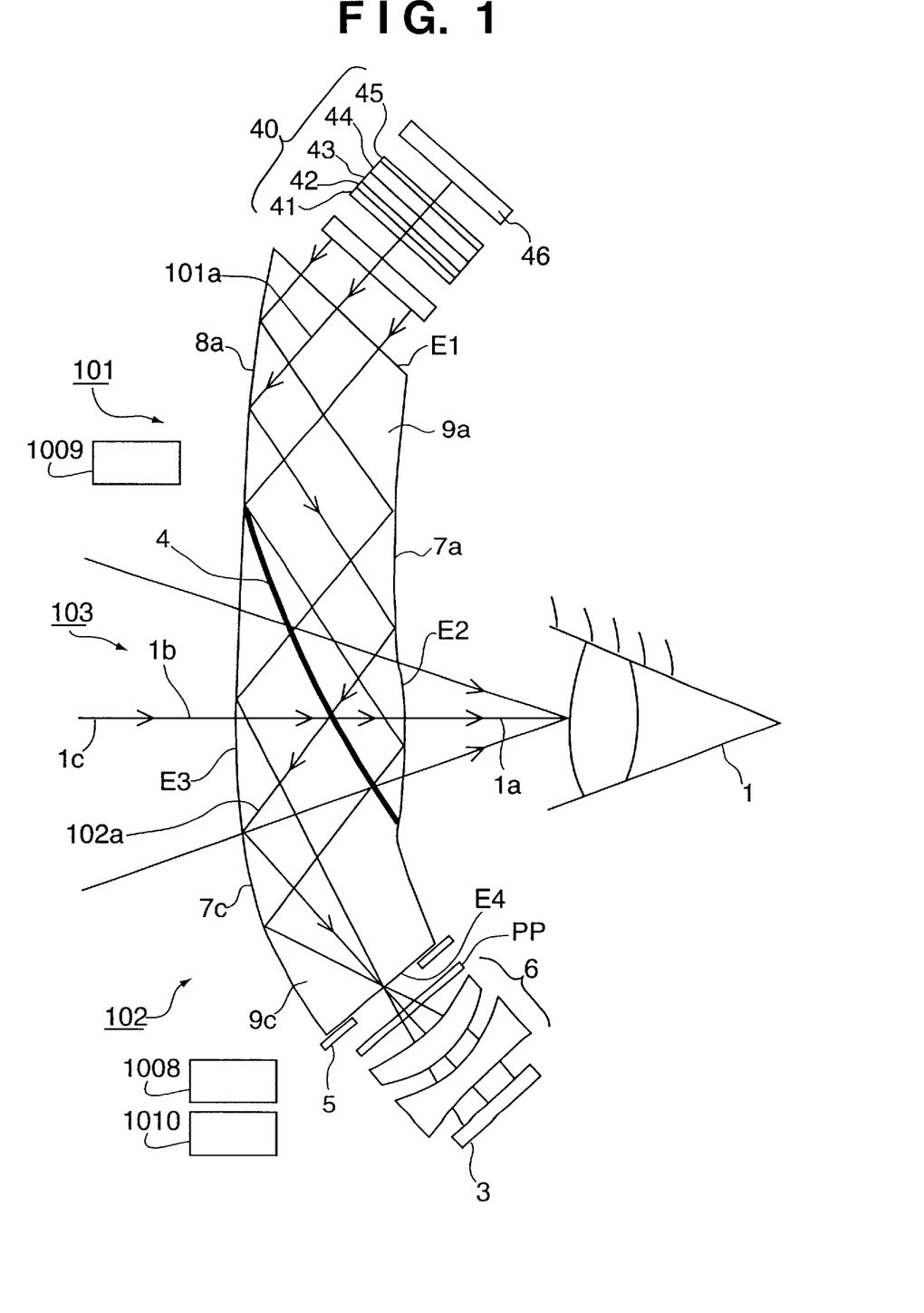
FIG. 1 is a view showing an optical system configuration of a composite display apparatus in accordance with a first embodiment of the present invention.

Referring first to FIG. 1, there is shown a side view of an optical system configuration of a composite display apparatus in accordance with a first embodiment of the present invention. As it is clear from the comparison with FIG. 11 showing a configuration of the prior art, the composite display apparatus in accordance with this embodiment has the same configuration as that of the prior art, except that it is provided with constituents 1008 to 1010 described later.

Figure 3:
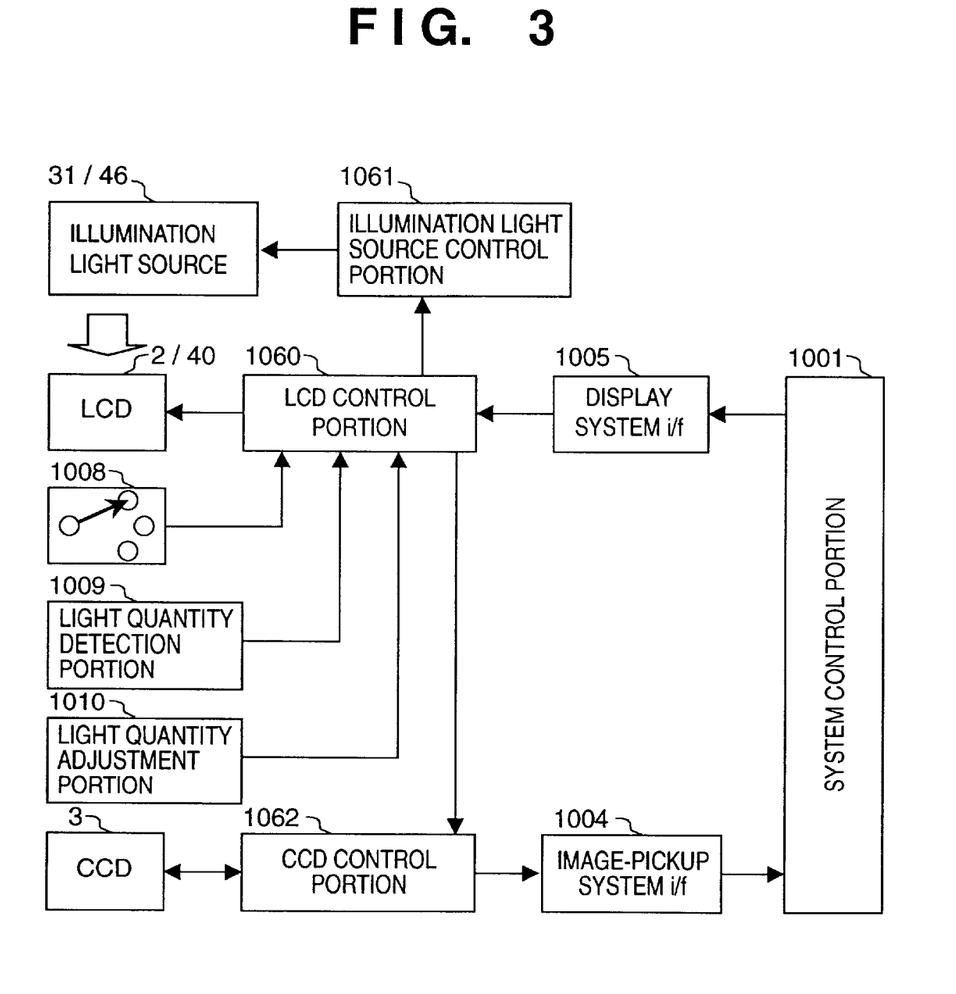
FIG. 3 is a block diagram showing a control circuit configuration of the composite display apparatus in accordance with the first embodiment of the present invention.

Referring to FIG. 3, there is shown a block diagram of one example of control circuit configurations of the composite display apparatus in accordance with this embodiment. In the same figure, reference numeral 1001 denotes a system control portion for controlling the entire composite display apparatus which consists of a computer system including CPU, ROM, RAM, etc. Reference numeral 1062 denotes a CCD control portion for performing timing control over a CCD 3, adjustments of image-pickup data, etc., numeral 1004 an image-pickup system interface portion for converting image-pickup data to a data format which can be input to the system controlling portion 1001, numeral 1005 a display system interface portion for converting display data output from the system control portion 1001 to a data format which can be displayed by a color LCD 40, numeral 1060 an LCD control portion for performing timing control over the color LCD 40, adjustments of the display data, etc., and numeral 1061 an illumination light source control portion for controlling operation timing of illumination light sources (31 or 46).

Reference numerals 1008, 1009 and 1010, which are newly added in this embodiment, denote an operation mode switching portion consisting of switches etc. for switching the operation mode, a light quantity detection portion consisting of an optical sensor etc. and arranged in front of the display/image-pickup optical systems for detecting the quantity of the light from external world, and a light quantity adjustment portion consisting of a volume, a jog dial, etc. for changing both illumination light source operation and shutter speed at the same time, respectively.

Figure 4A:
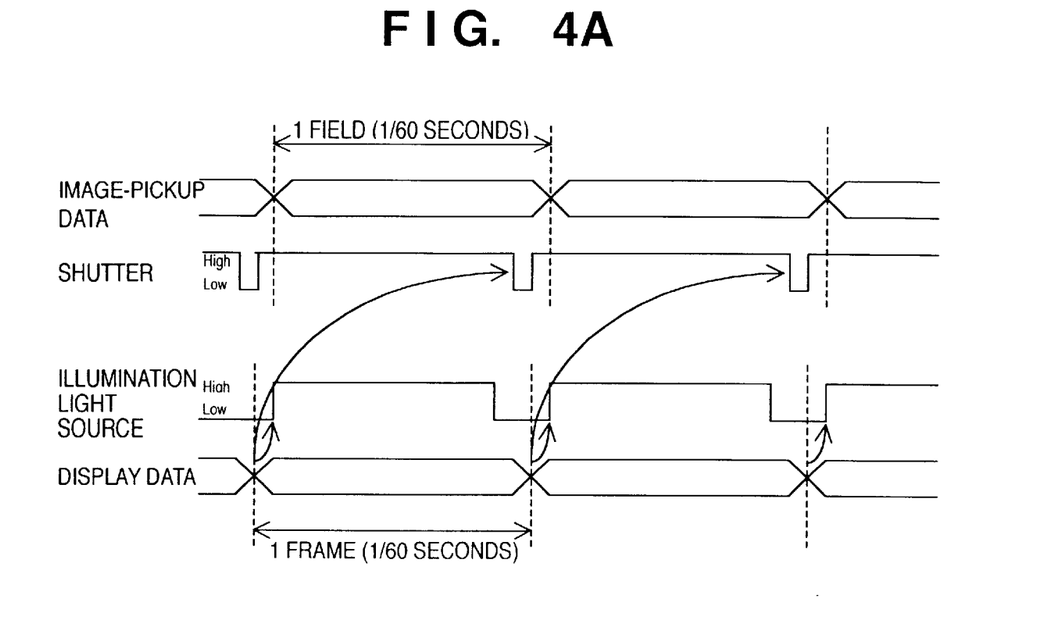
FIGS. 4A and 4B are timing charts illustrating the display control and illumination control in the composite display apparatus in accordance with the first embodiment of the present invention.
Figure 4B:
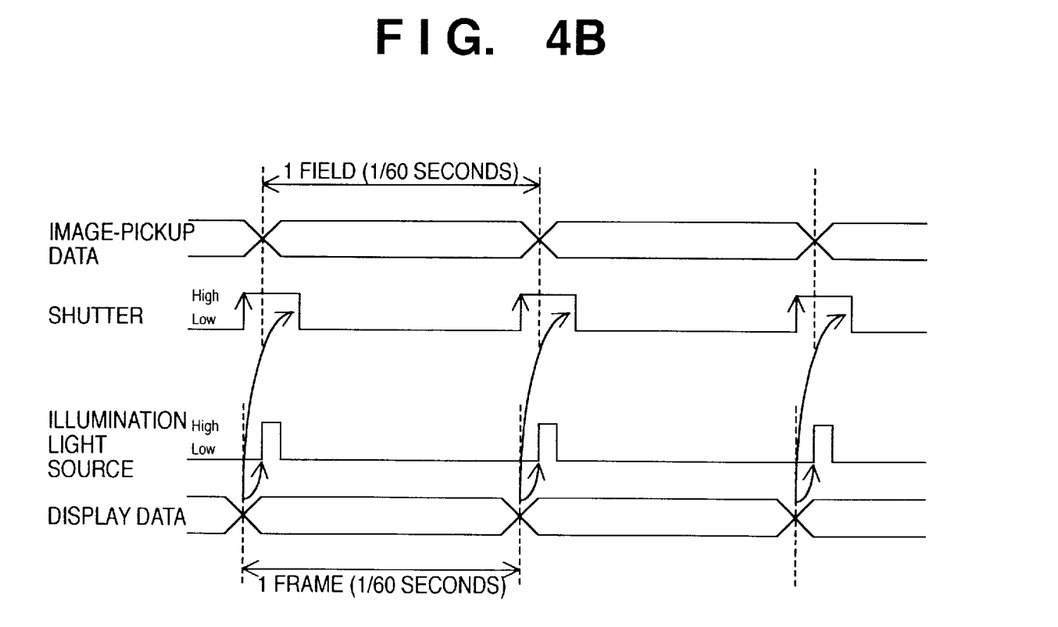

Referring to FIGS. 4A and 4B, there is shown a timing chart of the control circuit shown in FIG. 3. In the same figure, "IMAGE-PICKUP DATA" shows the state of image-pickup data output from the CCD 3, and "SHUTTER" the state of an electronic shutter, High indicating the closed state, Low indicating the open state. "DISPLAY DATA" shows the state of the contents displayed on the color LCD 40, "ILLUMINATION LIGHT SOURCE" shows the state of a white illumination light source 46, High indicating the operating state and Low indicating non-operating state.

In the image-pickup system, image-pickup data are output from the CCD 3 based on the timing controlled by the CCD control portion 1062, subjected to data adjustments, such as CDS (Correlated Double Sampling), AGC (Automatic Gain Control) and AWB (Automatic White Balance), at the CCD control portion 1062, converted to standard data of, for example, NTSC and PAL, at the image-pickup system interface portion 1004, and introduced into the system control portion 1001.

On the other hand, in the display system, display data of, for example, VGA and LDI formats output from the system control portion 1001 are converted at the display system interface portion 1005 to a data format which can be displayed by the color LCD 40, subjected to data adjustments such as a gamma correction at the LCD control portion 1060, and output to the LCD (2 or 40) based on the timing generated so as to display an image thereon. In this process, the signal of the display timing is input to the illumination light source control portion 1061 as well, so that the operation timing of the illumination light source (31 or 46) can be controlled according to the display timing.

In order for the operation timing of the illumination light source 46 in the display system not to coincide with the timing of opening the electronic shutter in the image-pickup system, first the display timing signal of the LCD control portion 1060 is input to the CCD control portion 1062 to establish synchronization of the display system and the image-pickup system. Then, the illumination light source 46 is allowed to be in the on state for a fixed period of time by the illumination light source control portion 1061, and a trigger signal for opening the electronic shutter for a fixed period time is output from the CCD control portion 1062 to the CCD 3.

(Operation Mode)

Although the operation of a composite display apparatus is basically as described above, the composite display apparatus of this embodiment further provides the following three operation modes through the operation mode switching portion 1008, in view of various environments in which it is used. The operation mode can be changed by operating switches etc. which constitute the operation mode switching portion 1008. The operation mode switching portion 1008 may consist of three buttons each corresponding to each mode or may consist of one button and be constructed in such a manner that every time the button is pressed, its mode is changed. Preferably, the operation mode switching portion 1008 is constructed in such a manner that the users can recognize the selected operation mode. Specifically, the operation mode switching portion 1008 can be constructed in such a manner that its state is transmitted to an external unit (not shown in the figure) for generating display data to be displayed on the LDC and every time its state is changed, the information of the selected mode name etc. is superposed on the displayed data.

The first operation mode is fixing mode in which the shutter speed is set at $1/100$ seconds in view of the occurrence of flicker when using the composite display apparatus indoors, like the composite display apparatus of the prior art. Based on 1 field (60 Hz) of the NTSC, which is a standard signal of a video system, the period of one cycle is $1/60$ seconds, accordingly the operating duration of the illumination light source 46 at this time is ($1/60$–$1/100$) seconds or less, that is, 6 milliseconds.

The second operation mode is automatic mode in which the quantity of light from the external world is detected by the light quantity detection portion 1009 arranged in front of the display/image-pickup optical systems and both shutter speed and operation time of the illumination light source 46 are automatically adjusted to the light from the external world. In other words, the composite display apparatus in the automatic mode automatically controls both shutter speed and operation time of the illumination light source 46 according to the output values of the light quantity detection portion 1009; specifically, when it is used in a light environment, the shutter speed is made shorter and the operation time of the illumination light source 46 is made longer, as shown in FIG. 4A, and when it is used in a dark environment, the shutter speed is made longer and the operation time of the illumination light source 46 is made shorter.

This automatic control can be realized by previously measuring the relationship between the shutter speed and the operation time of the illumination light source 1009 under various conditions, storing the optimum values at the LCD control portion 1060, and referring to the stored data of the shutter speed and the operation time using the output values of the light quantity detection portion 1009.

The third operation mode is manual mode in which the user of the composite display apparatus of this embodiment adjusts the light quantity adjustment portion 1010, which consists of a volume, a jog dial, etc., so as to adapt the shutter speed and operation time of the illumination light source 46 to the light from the external world simultaneously.

For example, when adjusting the light quantity adjustment portion 1010 on the "LIGHT" side, according to the input values (the values may be absolute values or variations depending on the input device constituting the light quantity adjustment portion), the shutter speed is made shorter and the operation time of the illumination light source 46 is made longer, as shown in FIG. 4A. Contrarily, when adjusting the light quantity adjustment portion 1010 on the "DARK" side, according to the input values, the shutter speed is made longer and the operation time of the illumination light source 46 is made shorter, as shown in FIG. 4B.

When the light quantity adjustment portion 1010 consists of a device which outputs absolute values, such as an analog volume, even in the manual mode, the shutter speed and the operation time of the illumination light source can be controlled by storing both input values from the light quantity adjustment portion 1010 and data of the relationship between the two at the LCD control portion 1060, like the case of the automatic mode. On the other hand, when the light quantity adjustment portion 1010 consists of a digital switch through which "+" and "−" are input, if the adjustment amounts of the shutter speed and the operation time on every "+" input and "−" input are stored, the shutter speed and the operation time can be changed by a fixed adjustment amount every time the switch is pressed. It goes without saying that the light quantity adjustment portion 1010 can consist of any input device other than the above examples, and the control method should be selected according to the type of values output from the input device. However, preferably the light quantity adjustment portion 1010 does not consist of more than one buttons or switches, but one device such as a volume, for convenience.

(Modification to the First Embodiment)

Figure 2:
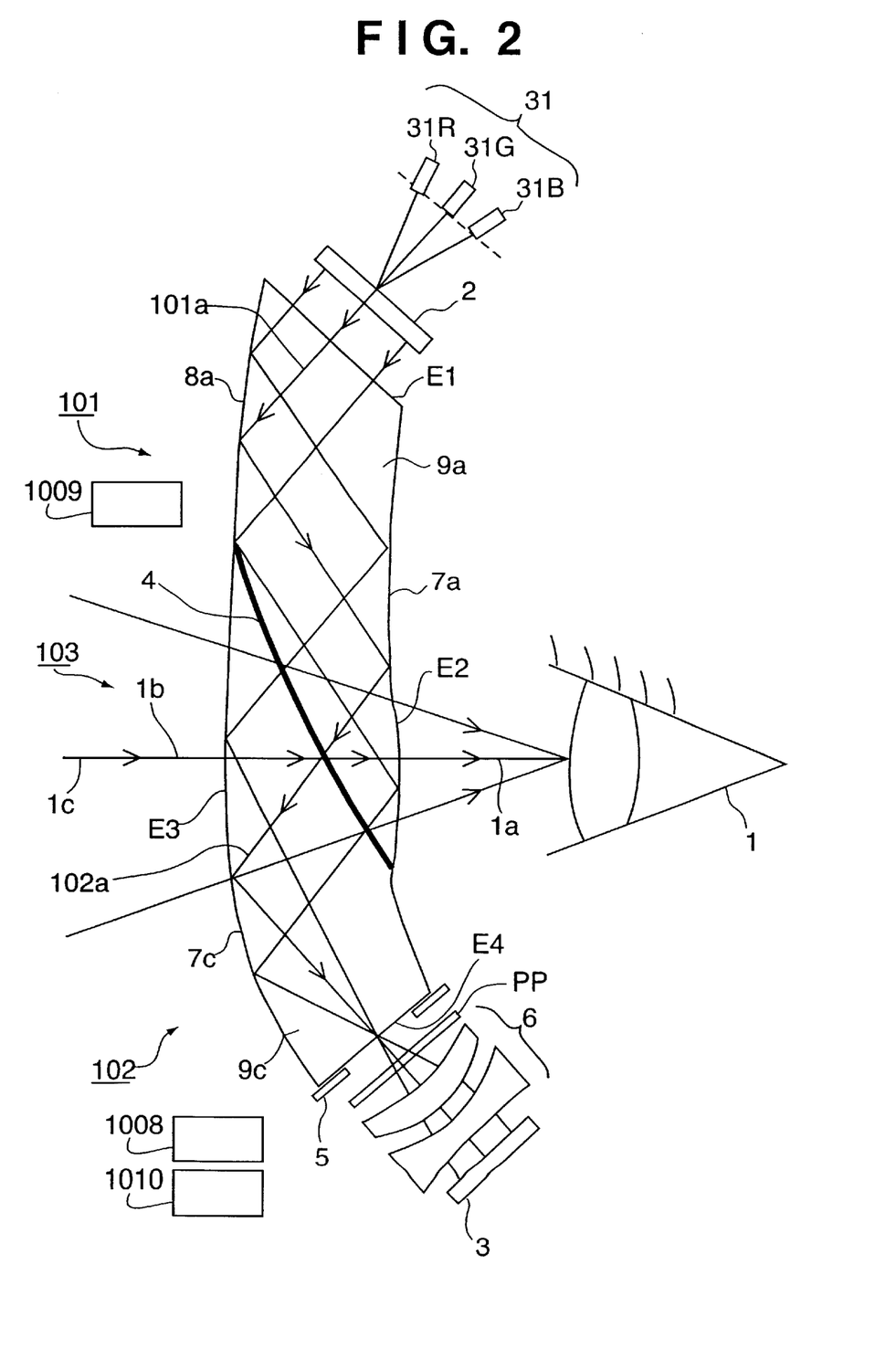
FIG. 2 is a view showing an optical system configuration of a composite display apparatus in accordance with a modification to the first embodiment of the present invention.

Referring now to FIG. 2, there is shown a side view of an optical system configuration of a composite display apparatus in which a color display is realized by a combining of a ferroelectric display element 2 (FLCD) and light sources 31R, 31G and 31B of colors R, G and B in stead of the color LCD 40 in FIG. 1. The composite display apparatus shown in FIG. 2 has the same optical system configuration as that of the prior art shown in FIG. 10, except that its optical system configuration is provided with a mode switching portion 1008, a light quantity detection portion 1009 and a light quantity control portion 1010.

In the composite display apparatus having such a configuration, the same control as that of the first embodiment can be exercised by changing, in the control circuit shown in FIG. 3, the illumination light source controlled by the illumination light source control portion 1061 to 31R, 31G and 31B and the LCD controlled by the LCD control portion 1060 to a FLCD 2.

Figure 5A:
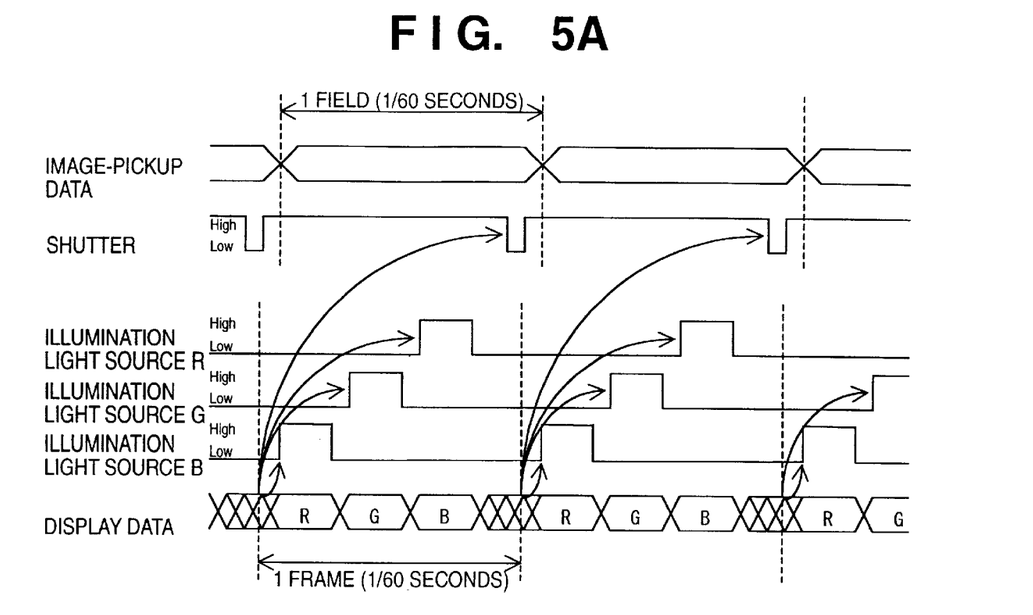
FIGS. 5A and 5B are timing charts illustrating the display control and illumination control in the composite display apparatus in accordance with a modification to the first embodiment of the present invention.
Figure 5B:
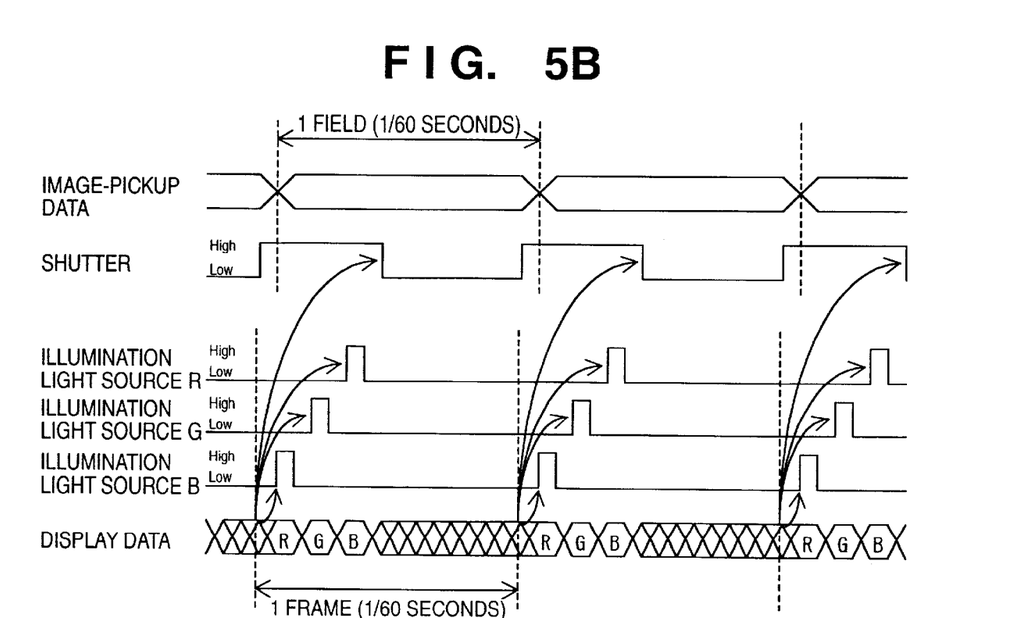

Specifically, when adjusting the light quantity adjustment portion 1010 on the "LIGHT" side, according to the input values (the values may be absolute values or variations depending on the input device constituting the light quantity adjustment portion), the shutter speed is made shorter and the operation time of each of the illumination light sources 31R, 31G and 31B is made longer, as shown in FIG. 5A. Contrarily, when adjusting the light quantity adjustment portion 1010 on the "DARK" side, according to the input values, the shutter speed is made longer and the operation time of each of the illumination light sources 31R, 31G and 31B is made shorter, as shown in FIG. 5B. Thus, even if the type of the display device is changed, the same effect can be obtained.

(Second Embodiment)

Now a second embodiment of the present invention will be described with reference to FIGS. 6, 7A and 7B.

Figure 6:
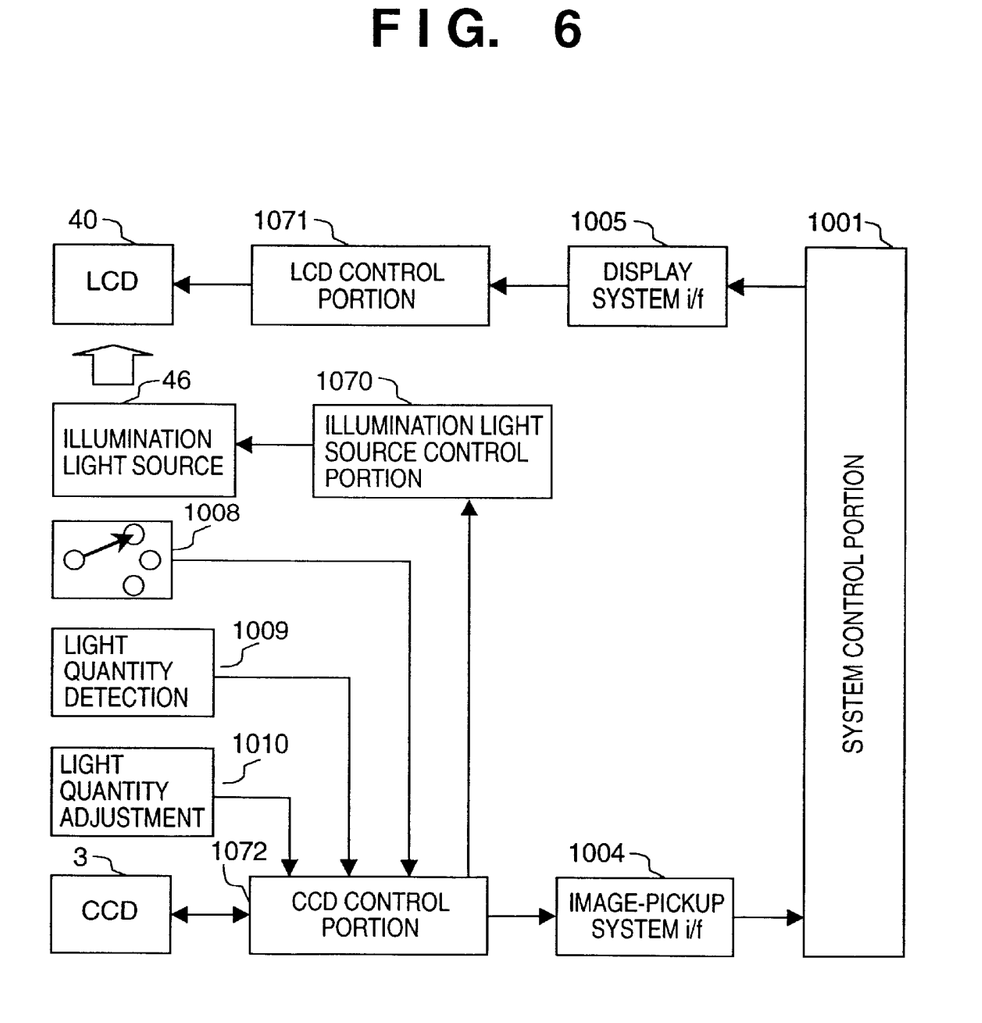
FIG. 6 is a block diagram showing a control circuit configuration of a composite display apparatus in accordance with a second embodiment of the present invention.
Figure 7A:
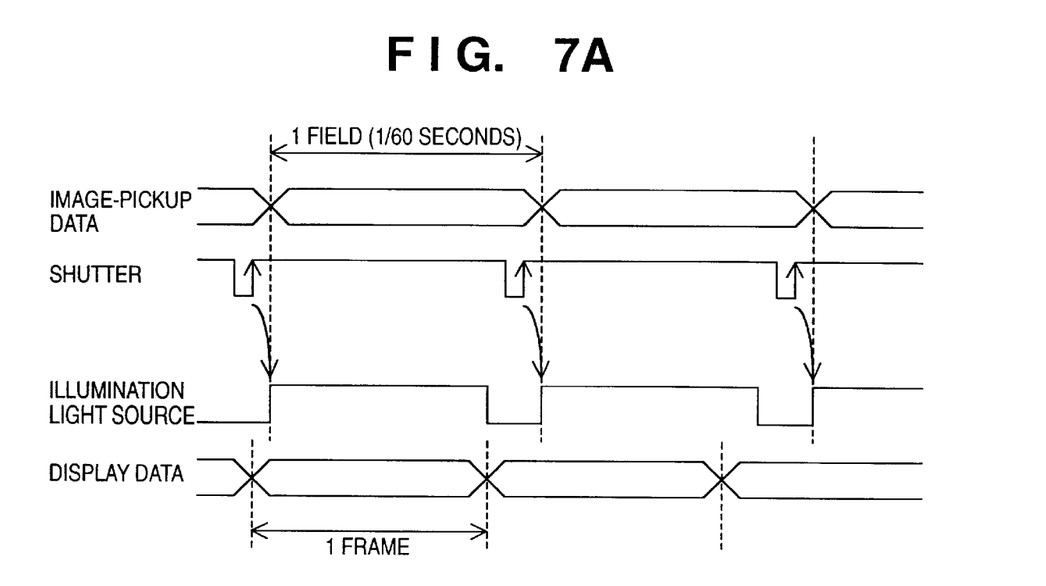
FIGS. 7A and 7B are timing charts illustrating the operation of the control circuit shown in FIG. 6.
Figure 7B:
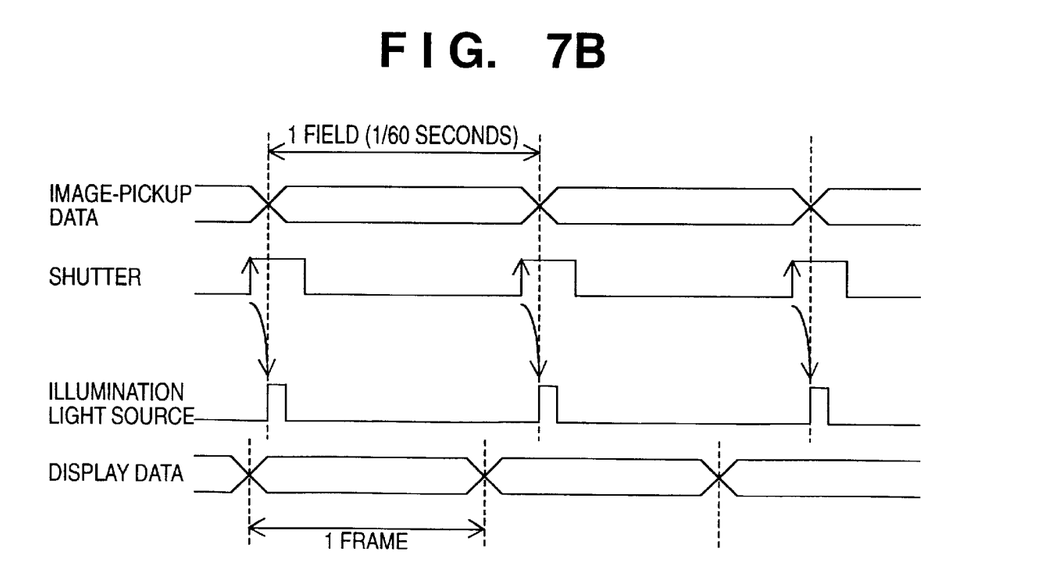

Referring to FIG. 6, there is shown a block diagram of one example of control circuit configurations of a composite display apparatus in accordance with the second embodiment of the present invention, and FIGS. 7A and 7B are a timing chart illustrating the operation of the control circuit shown in FIG. 6.

Compared to FIG. 6 the control circuit of the first embodiment shown in FIG. 3, it is clear that the control circuit of the second embodiment is the same as that of the first embodiment, except that its image-pickup system and LCD are not in synchronization with each other, but its image-pickup system and the illumination light sources alone are in synchronization with each other. Accordingly, the control circuit of this embodiment cannot apply to the composite display apparatus having the configuration shown in FIG. 2 in which the FLCD and the illumination light sources 31R, 31G and 31B have to be in synchronization with each other, but can apply only to the composite display apparatus having the configuration shown in FIG. 1.

As shown in FIGS. 7A and 7B, in order for the operation timing of the illumination light source 46 in the display system not to coincide with the timing of opening an electronic shutter in the image-pickup system, first an image-pickup timing signal of an CCD control portion 1072 is input to a illumination light source control portion 1070 so as to establish synchronization of the image-pickup system and the illumination light source 46. Then, the illumination light source 46 is allowed to be in the on state for a fixed period of time by the illumination light source control portion 1070, and a trigger signal for opening the electronic shutter for a fixed period time is output from the CCD control portion 1072 to the CCD 3.

At this point, the image display of the LCD 40 is performed at an arbitrary timing not in synchronization with the image-pickup system/illumination light sources. This means that the composite display apparatus can be free from the constraint that the field period of the image-pickup system should correspond to the frame period of the display system.

In this embodiment, the output from the operation mode switching portion 1008, the light quantity detection portion 1009 and the light quantity control portion 1010 is all supplied to the CCD control portion 1072. Accordingly, the shutter speed and the operation time of the illumination light sources in each operation mode are controlled by the CCD control portion 1072 in this embodiment, while they are controlled by the LCD control portion 1060 in the first embodiment. Since the method and content of the control are the same as those of the first example, the detailed description shall be omitted here.

FIGS. 7A and 7B show examples of control methods when the light quantity from the external world is large and when the same is small, in case where the composite display apparatus is in automatic mode, respectively.

In the above embodiments, the present invention has been described only in terms of the cases where transmission type LCDs are adopted as display devices used in the composite display apparatus; however, the same effect can be realized even if reflection type LCDs are adopted. And spontaneous luminescence type display devices such as ELs can also be used instead of the color LCD 40.

Further, in the above embodiments, the present invention has been described in terms of the cases where a CCD is adopted as the image-pickup device; however, other image-pickup devices such as a C-MOS area sensor may also be used.

In the above embodiments, the present invention has been described in terms of the cases where image-pickup data are displayed by the interlace method (field); however, the display control of the present invention can apply to the cases where the non-interlace method (frame) is adopted. Contrarily, the present invention has been described in terms of the cases where display data are displayed by the non-interlace method (frame); however, the display control of the present invention can apply to the cases where the interlace method (field) is adopted.

Further, in the above embodiments, the present invention has been described in terms of the cases where the field/frame period is $\frac{1}{60}$ seconds; however, the present invention is not intended to be limited to this field/frame period.

Further, in the above embodiments, the present invention has been described in terms of the cases where image-pickup data are the standard data such as NTSC, PAL, etc.; however, the present invention is not intended to be limited to these standard data, and the image-pickup data may have their own data format.

In the above embodiments, the present invention has been described in terms of the cases where the shutter speed and the operation time of the illumination light source are $\frac{1}{100}$ seconds and 6 milliseconds, respectively, in fixed mode; however, the present invention is not intended to be limited to these shutter speed and operation time. The present invention can apply to the cases where the shutter speed is 0 second, that is, image-pickup is not performed (display mode), or on the contrary the operation time of the illumination light source is 0 second, that is, display is not performed (image-pickup mode).

Further, in the above embodiments, the present invention has been described in terms of the cases where there are three types operation modes selectable at the operation mode switching portion 1008; however, the present invention is not intended to be limited to these operation modes. It can be considered that, for example, a display mode and an image-pickup mode are added, or the combinations of the operation modes of the image-pickup system and display system are added in which the operation mode of each system is changed independently, or the types of operation modes selectable are reduced.

Further, in the above embodiments, the present invention has been described in terms of the cases where the light quantity adjustment portion 1010 is constructed in such a manner that the operation time of the illumination light source(s) and the shutter speed are changed simultaneously by the operation thereof; however, the present invention is not intended to be limited to this construction. The light quantity adjustment portion 1010 can be constructed in such a manner as to consist of two or more dials, switches, etc. so that the operation time of the illumination light source(s) and the shutter speed can be adjusted independently, or in such a manner as to consist of one dial so that either of the operation time of the illumination light source(s) and the shutter speed can be adjusted using the dial while fixing the other.

As described so far, according to the present invention, a composite display apparatus can be provided which enables keeping both optical density of display images formed by a display means and shutter speed of cameras such as a CCD in an optimum state relative to the external world light even in various use environments. In addition, the present invention allows a composite display apparatus to be free from the constraint that the field period of the image-pickup system should correspond to the frame period of the display system, thereby a flexible composite display apparatus can be provided.

Furthermore, the present invention can be applied to the system comprising either a plurality of units or a single unit. It is needless to say that the present invention can be applied to the case which can be attained by supplying programs which execute the process defined by the present system or invention.

What is claimed is:

1. A display comprising: a display optical system for guiding a light beam from a display means to the eyeballs of an observer; an image-pickup optical system for allowing a light beam from its external world to form an image on an image-pickup means; and optical path separating means provided in optical path for allowing an ocular optical axis of the light beam of said display optical system entering the eyeballs of the observer, or an imaginary ocular optical axis which is an extension of said ocular optical axis, and an external world optical axis of the light beam entering said image-pickup optical system from the external world to substantially coincide; the display means displaying image information periodically and intermittently, the image-pickup means recording image information from the external world periodically while the display means is not displaying image information, wherein the display further comprises change means capable of changing the display period of displaying image information on the display means and/or the image-pickup period of recording image information from the external world in the image-pickup means.

2. The composite display apparatus according to claim 1, wherein the display optical system has more than one reflection surface.

3. The composite display apparatus according to claim 1, wherein the display period of the display means and the image-pickup period of the image-pickup means are equal.

4. The composite display apparatus according to claim 1, wherein the display means has an illumination light source which is in the on state while image information is being displayed, the operation time period of the illumination light source and the image-pickup period of the image-pickup means are equal, and wherein the image information from the external world is recorded only while the illumination light source is in the off state.

5. The composite display apparatus according to claim 1, wherein the display means is a color LCD and the illumination light source is white illumination.

6. The composite display apparatus according to claim 1, wherein the display means consists of a color spontaneous-luminescence-type display device.

7. The composite display apparatus according to claim 1, further comprising more than one luminescent color corresponding to more than one color component constituting an color image as well as a color light source for illuminating the display means with the luminescent colors one by one, the display means displaying monochrome image information corresponding to the luminescent color from the color light source.

8. The composite display apparatus according to claim 1, further comprising external world light quantity detection means for detecting the quantity of light from the external world, the change means changing the display period and/or the image-pickup period according to the light quantity detected by the external world light quantity detection means.

9. The composite display apparatus according to claim 1, further comprising light quantity adjustment means, the change means changing the display period and/or the image-pickup period based on the values set through the light quantity adjustment means.

10. The composite display apparatus according to claim 1, further comprising external world light quantity detection means for detecting the quantity of light from the external world, light quantity adjustment means, and operation switching means, the operation switching means having a first state in which the external world light quantity detection means is allowed to be effective, a second state in which the light quantity adjustment means is allowed to be effective, and a third state in which both external world light quantity detection means and light quantity adjustment means are allowed to be invalid, the change means changing the display period and/or the image-pickup period according to the light quantity detected by the external world light quantity detection means when the operation switching means is in the first state, changing the display period and/or the image-pickup period based on the values set through the light quantity adjustment means when the operation switching means is in the second state, and fixing the display period and/or the image-pickup period at fixed values when the operation switching means is in the third state.

11. The composite display apparatus according to claim 1, wherein the optical path separating means consists of an eccentrically curved reflection surface or a half mirror surface.

12. The composite display apparatus according to claim 1, wherein the image-pickup optical system and the display optical system are separated into optical paths in the opposite directions by the optical path separating means, the display optical system including the reflection surface on one side of the optical path separating means, the image-pickup optical system including the reflection surface on the other side of said optical path separating means.

13. A head mounted display system using the composite display apparatus according to claim 1.

* * * * *

UNITED STATES PATENT AND TRADEMARK OFFICE
CERTIFICATE OF CORRECTION

PATENT NO. : 6,653,989 B2
DATED : November 25, 2003
INVENTOR(S) : Nakanishi

It is certified that error appears in the above-identified patent and that said Letters Patent is hereby corrected as shown below:

Column 5,
Line 17, "non-" should read -- the non- --.

Column 6,
Line 2, "light" should read -- lighted --.

Column 8,
Line 65, "indicating" should read -- indicating the --.

Column 10,
Line 56, "buttons or switches" should read -- button or switch --;
Line 61, "combining of" should read -- combination of --; and
Line 63, "in stead" should read -- instead --.

Column 11,
Line 30, "are a" should read -- are --;
Line 31, "timing chart" should read -- timing charts --;
Line 50, "an CCD" should read -- a CCD --; and
Line 51, "a illumination" should read -- an illumination --.

Column 14,
Line 9, "constituting an" should read -- constituting a --.

Signed and Sealed this

Twenty-fifth Day of May, 2004

JON W. DUDAS
*Acting Director of the United States Patent and Trademark Office*